(12) United States Patent
Tu et al.

(10) Patent No.: US 11,754,768 B2
(45) Date of Patent: Sep. 12, 2023

(54) AUGMENTED REALITY DISPLAY DEVICE

(71) Applicant: Acer Incorporated, New Taipei (TW)

(72) Inventors: Tsung-Wei Tu, New Taipei (TW);
Yi-Jung Chiu, New Taipei (TW);
Shih-Ting Huang, New Taipei (TW);
Yen-Hsien Li, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/898,465

(22) Filed: Aug. 29, 2022

(65) Prior Publication Data
US 2023/0204845 A1    Jun. 29, 2023

(30) Foreign Application Priority Data
Dec. 23, 2021 (TW) ................. 110148367

(51) Int. Cl.
*F21V 8/00* (2006.01)
*G02F 1/31* (2006.01)

(52) U.S. Cl.
CPC ............. *G02B 6/0035* (2013.01); *G02F 1/31* (2013.01); *G02F 2203/50* (2013.01)

(58) Field of Classification Search
None
See application file for complete search history.

(56) References Cited

U.S. PATENT DOCUMENTS

| | | | |
|---|---|---|---|
| 9,958,682 B1 | 5/2018 | Moore et al. | |
| 10,768,427 B2 | 9/2020 | Ha | |
| 10,859,834 B2 | 12/2020 | Connor | |
| 2004/0174599 A1* | 9/2004 | Dietrich | G02B 27/0172 359/489.08 |
| 2016/0238845 A1* | 8/2016 | Alexander | G06F 3/013 |
| 2018/0003972 A1* | 1/2018 | Kress | G02B 27/0172 |
| 2019/0079302 A1 | 3/2019 | Ninan et al. | |
| 2021/0225268 A1 | 7/2021 | Peng et al. | |

FOREIGN PATENT DOCUMENTS

| | | |
|---|---|---|
| DE | 102020103824 A1 * | 8/2021 |
| TW | 202012993 | 4/2020 |
| TW | 202024752 | 7/2020 |

* cited by examiner

Primary Examiner — Shan Liu
(74) Attorney, Agent, or Firm — JCIPRNET

(57) ABSTRACT

An augmented reality display device, which is configured to provide an augmented reality image to an eye of a user, includes a display module and multiple mirror sets. The display module includes a projector and multiple switching elements. The projector provides an original image beam. The switching elements are deposed sequentially on a path of the original image beam. Each of the switching elements reflects or transmits the original image beam. Reflection paths of each ray of the original image beam on the switching elements intersect at one point to generate multiple image beams. The mirror sets are disposed on paths of the image beams. The image beams are reflected at different angles on the mirror sets, and the mirror sets reflect the image beams to the eye.

20 Claims, 9 Drawing Sheets

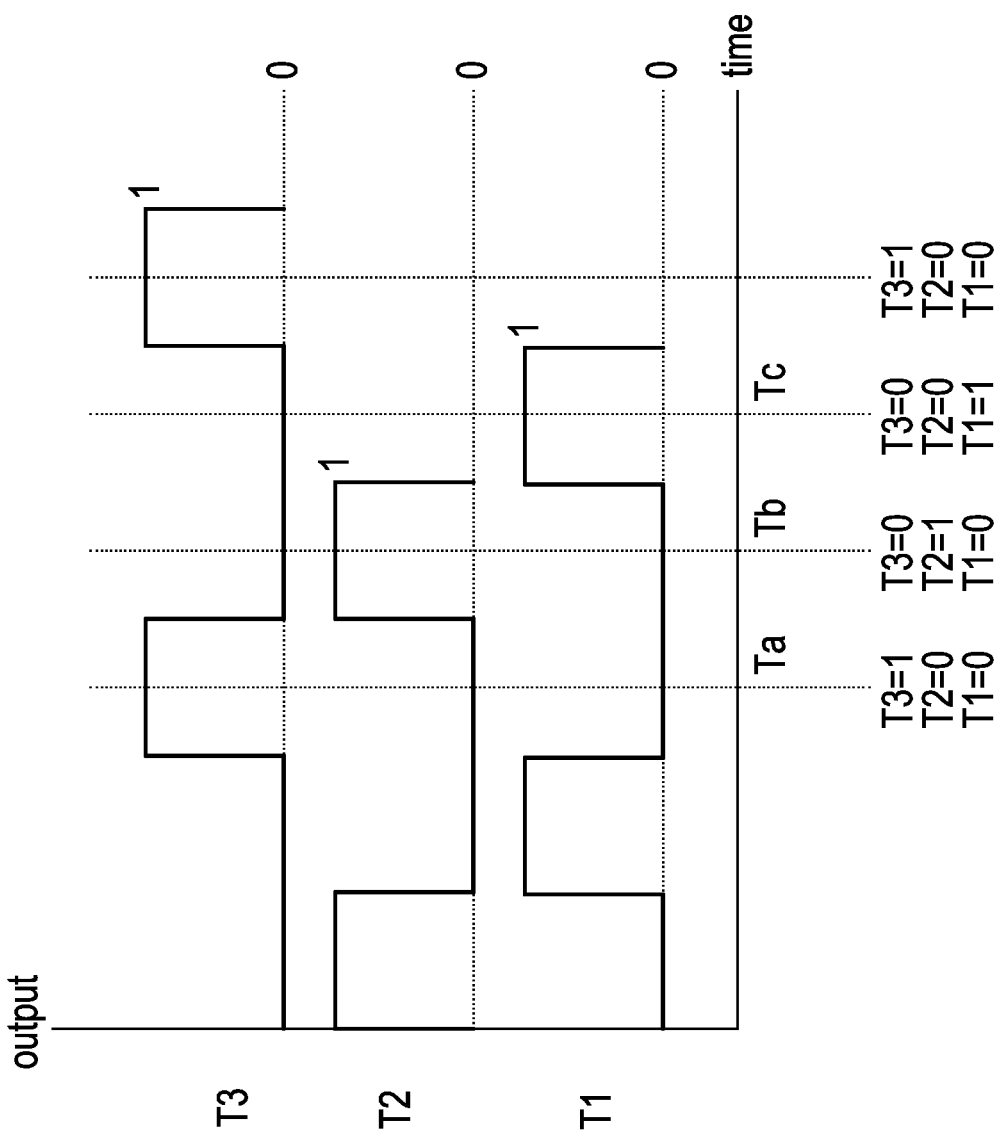

AUGMENTED REALITY DISPLAY DEVICE

CROSS-REFERENCE TO RELATED APPLICATION

This application claims the priority benefit of Taiwan application serial no. 110148367, filed on Dec. 23, 2021. The entirety of the above-mentioned patent application is hereby incorporated by reference herein and made a part of this specification.

BACKGROUND

Technical Field

The disclosure relates to a display device, and in particular to an augmented reality display device

Description of Related Art

In virtual reality (VR) display technology or augmented reality (AR) display technology, different images with disparity can be projected in the left and right eyes of the user, allowing the left and right eyes to focus on different planes to produce stereo vision. However, at this stage, some studies point out that although this technology allows users to produce stereo vision, the left and right eyes are still focused on the positions of the same depth in different planes, which is not the same visual effect as the human eye in the actual space to focus on the positions of different depths of the object. This difference is one of the reasons for the dizziness of some users, an effect called vergence-accommodation conflict (VAC).

In order to solve the vergence-accommodation conflict, a known technology uses a pinhole mirror to reflect the image beam to the human eye, using pinhole imaging technology to achieve the effect of long depth of field, so that the focus distance of the human eye can be wider, and make the distance between the intersection of the two eyes and the focus distance of the human eye can be consistent to effectively solve the vergence-accommodation conflict. In the main optical structure of the known technology, the image beam covering different field of view (FoV) is emitted from different positions of the panel, transmitted through the optical lens and then incident on multiple pinhole mirrors. To make the optical lens thinner and lighter, the diameter of the optical lens needs to be reduced, but then the vertical field of view of the image needs to be reduced.

SUMMARY

The disclosure provides an augmented reality display device capable of achieving thin and light lenses.

According to an embodiment of the disclosure, an augmented reality display device configured to provide an augmented reality image to an eye of a user is provided. The augmented reality display device includes a display module and multiple mirror sets. The display module includes a projector and multiple switching elements. The projector provides an original image beam. The switching elements are disposed sequentially on a path of the original image beam. Each of the switching elements reflects or transmits the original image beam. Reflection paths of each ray of the original image beam on the switching elements intersect at one point to generate multiple image beams. The mirror sets are disposed on paths of the image beams. The image beams are reflected at different angles on the mirror sets, and the mirror sets reflect the image beams to the eye.

Based on the above, in the augmented reality display device provided by the embodiments of the disclosure, the reflection paths of the original image beam on the switching elements intersect at one point to generate multiple image beams, and the image beams are reflected at different angles on the mirror sets, so that beams generated by the image beams may be narrowed and the lenses may be thinned.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a schematic diagram of an output state of image beams of the augmented reality display device of FIG. 1 at different times.

DESCRIPTION OF THE EMBODIMENTS

Figure 1:
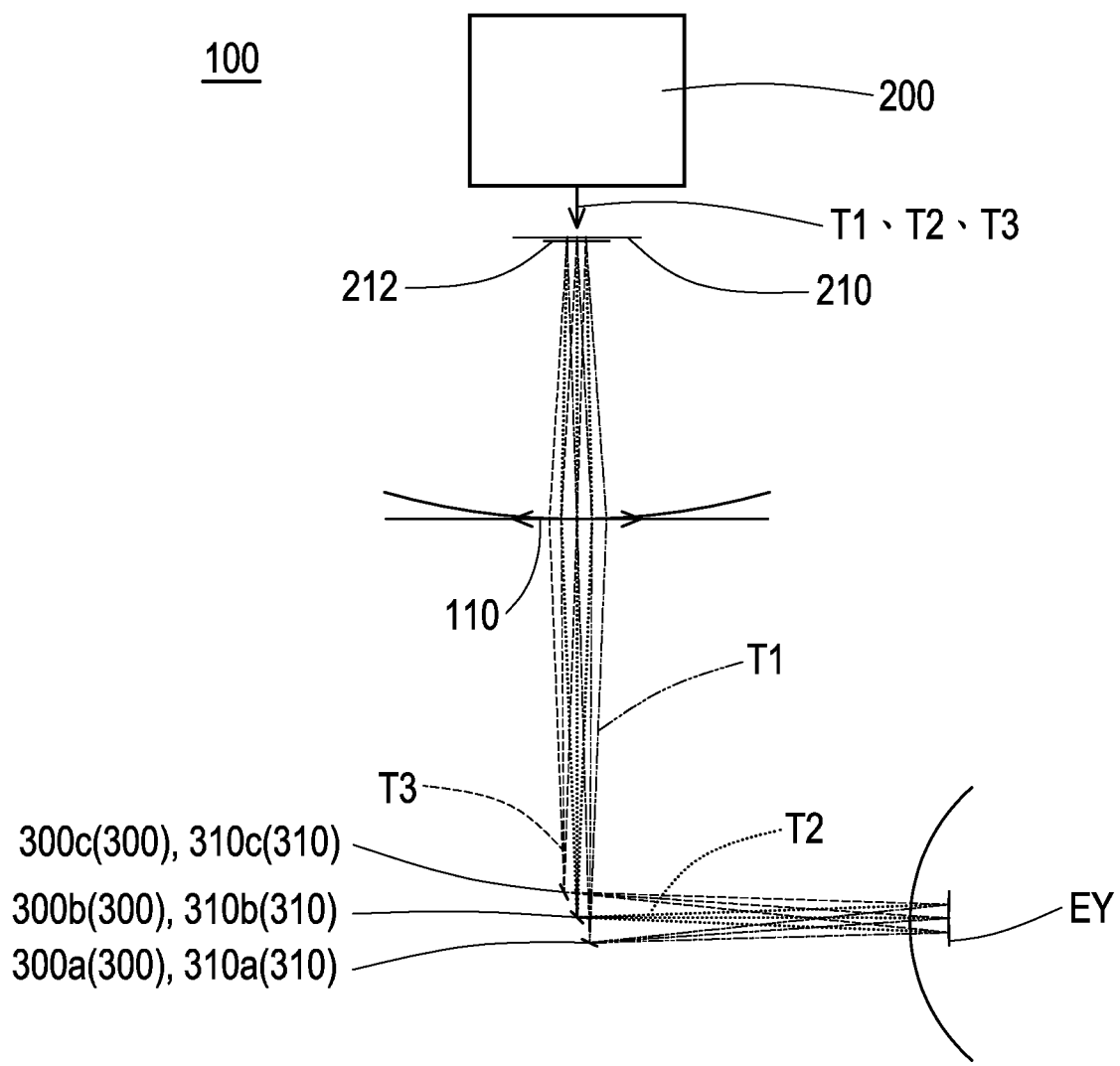
FIG. 1 is a schematic diagram of an augmented reality display device according to an embodiment of the disclosure.
Figure 2:
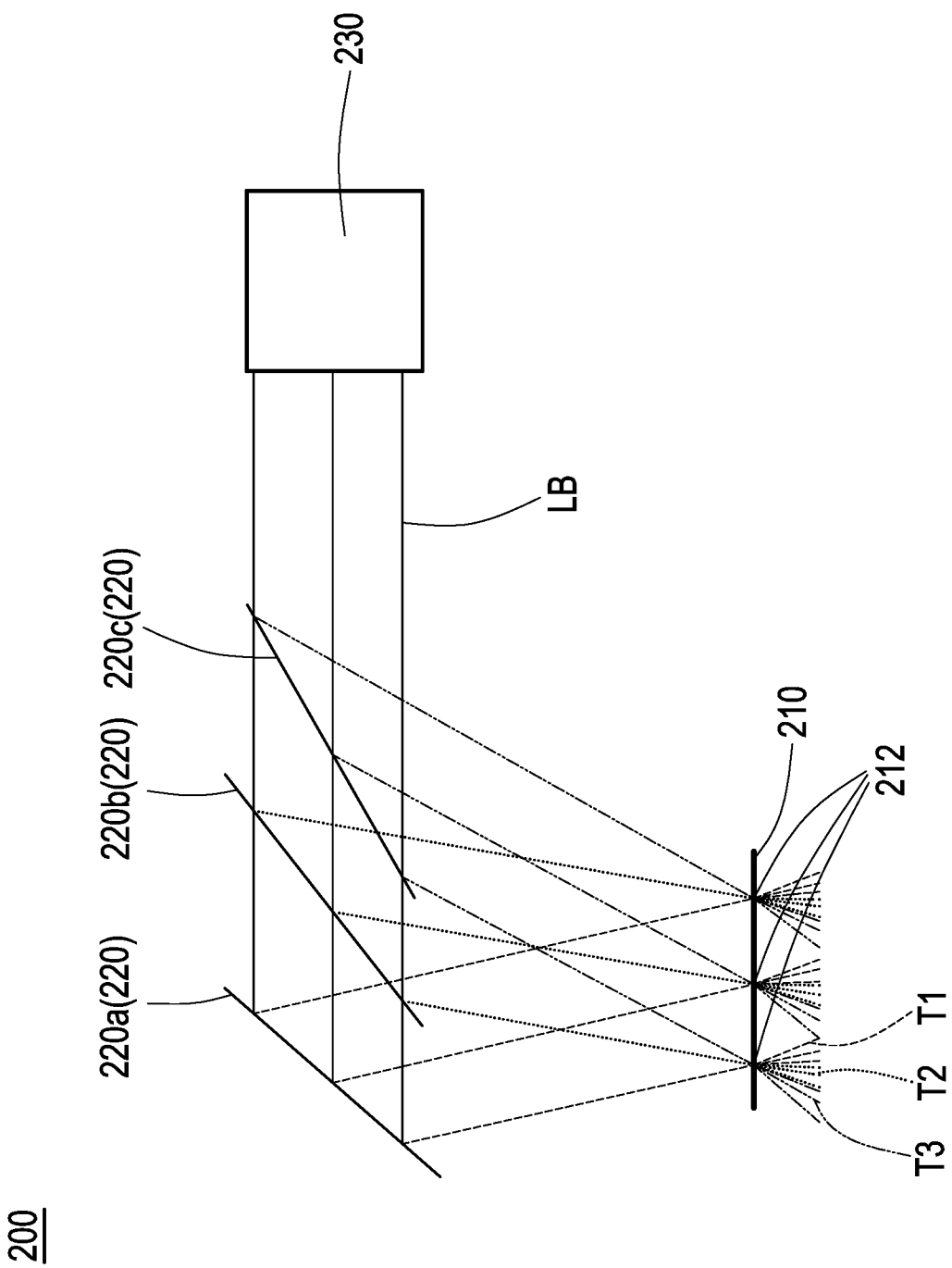
FIG. 2 is a schematic diagram of a display module of the augmented reality display device of FIG. 1.
Figure 3:
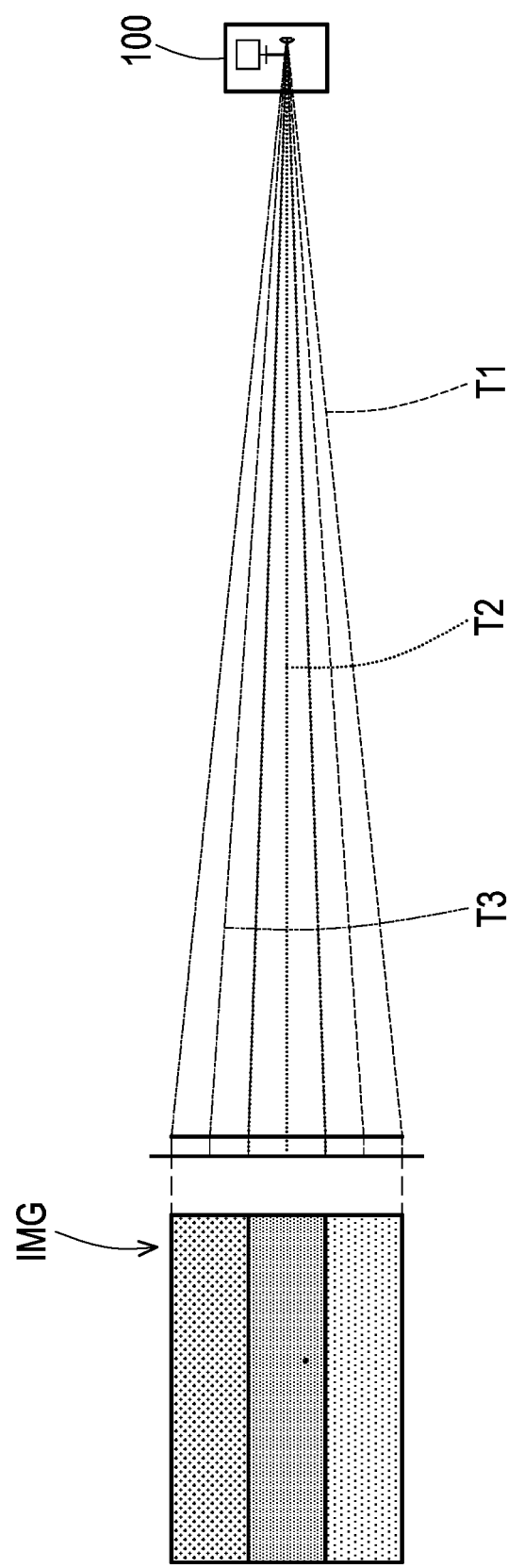
FIG. 3 is a schematic diagram of the augmented reality display device of FIG. 1 generating a virtual image in front of an eye of a user.

FIG. 1 is a schematic diagram of an augmented reality display device according to an embodiment of the disclosure. FIG. 2 is a schematic diagram of a display module of the augmented reality display device of FIG. 1. FIG. 3 is a schematic diagram of the augmented reality display device of FIG. 1 generating a virtual image in front of an eye of a user. Referring to FIG. 1 to FIG. 3, an augmented reality display device 100 includes a display module 200 and multiple mirror sets 300. The display module 200 includes a projector 230 and multiple switching elements 220. The projector 230 provides an original image beam LB. The switching elements 220 (e.g., switching elements 220a, 220b, 220c) are disposed sequentially on a path of the original image beam LB. Each of the switching elements 220 reflects or transmits the original image beam LB. Reflection paths of each ray of the original image beam LB on the switching elements 220 intersect at one point to generate multiple image beams (e.g., T1, T2, and T3). The mirror sets 300 are disposed on paths of the image beams T1, T2 and T3. The image beams T1, T2, and T3 are reflected at different angles on the mirror sets 300, and the mirror sets 300 reflect the image beams T1, T2, and T3 to an eye EY.

In detail, according to this embodiment, the display module 200 further includes a projected plate 210. Reflection paths of multiple rays of the original image beam LB on the switching elements 200 intersect at multiple points on the projected plate 210 to form multiple pixels 212. Each of the pixels 212 provides the image beams T1, T2, and T3 with different light emitting angles. According to this embodiment, the projected plate 210 is a diffuser or a microlens array. An optical lens 110 is disposed on the paths of the image beams T1, T2, and T3 for receiving the image beams T1, T2, and T3. The mirror sets 300 are disposed on the paths of the image beams T1, T2, and T3 from the optical lens 110, and each of the mirror sets 300 reflects one of the image beams T1, T2, and T3 to the eye EY. The reflection paths of the original image beam LB at positions of the switching elements 220a, 220b, and 220c corresponding to each other intersect at one point (i.e., a pixel 212) on the projected plate 210. The original image beam LB reflected by the switching elements 220 generates an image beam after being transmitted by the projected plate 210. For example, according to this embodiment, lights reflected by the switching elements 220 a, 220 b, and 220 c generate three image beams T1, T2, and T3 respectively behind the projected plate 210, but the switching elements 220 of the disclosure are not limited to three, nor are the image beams limited to three. Because the each of the pixels 212 of the projected plate 210 provides the image beams T1, T2, and T3 with different light emitting angles, the image beams T1, T2, and T3 emitted from the each of the pixels 212 partially overlap on an optical path toward the optical lens 110, so that beams generated by the image beams T1, T2, and T3 is narrowed, and therefore only the optical lens 110 with a smaller diameter needs to be used.

According to this embodiment, the each of the mirror sets 300 includes a micro-reflector 310, and the micro-reflectors 310 are disposed at different angles from each other. Alternatively, according to another embodiment, the each of the mirror sets 300 includes a micro-reflector 310 and a reflector 320. An image beam (e.g., one of the image beams T1, T2, and T3) from the each of the switching elements 220 (e.g., one of the switching elements 220a, 220b, and 220c) is sequentially reflected by the reflector 320 and the micro-reflector 310 and transmitted to the eye EY of the user. The reflectors 320 are disposed at different angles from each other, and the micro-reflectors 310 are disposed at the same angle from each other. The micro-reflector 310 is, for example, a pinhole mirror.

The augmented reality display device 100 is configured to provide an augmented reality image IMG to the eye EY of the user, as shown in FIG. 3. For example, referring to FIG. 1 and FIG. 3 at the same time, according to this embodiment, the mirror sets 300 are three mirror sets 300a, 300b and 300c, and the mirror sets 300a, 300b and 300c respectively include micro-reflectors 310a, 310b, and 310c. According to this embodiment, there may be multiple micro-reflectors 310a, multiple micro-reflectors 310b, and multiple micro-reflectors 310c. The micro-reflectors 310a, 310b, and 310c are arranged in a direction perpendicular to the paper of FIG. 1. The micro-reflectors 310a, 310b, and 310c respectively reflect the image beams T1, T2, and T3 to the eye EY of the user, and generate the augmented reality image IMG in front of the eye EY of the user. That is to say, virtual images of the image beams T1, T2, and T3 together generate the augmented reality image IMG. According to this embodiment, the mirror sets 300a, 300b, and 300c are arranged from top to bottom relative to the user (e.g., the micro-reflectors 310a, 310b, and 310c with different angles are arranged from top to bottom in FIG. 1), so the virtual images of the image beams T1, T2, and T3 are arranged from top to bottom, that is, the virtual images of the image beams T1, T2, and T3 cover different field of views in a vertical direction seen by the user, respectively. However, according to other embodiments, the mirror sets 300a, 300b, and 300c may also be arranged from left to right relative to the user (e.g., the micro-reflectors 310a, 310b, 310c with different angles are arranged from left to right), so that the virtual images of the image beams T1, T2, and T3 become arranged from left to right, i.e., the virtual images of the image beams T1, T2, and T3 cover different field of views in a horizontal direction as seen by the user. Although this embodiment takes the three mirror sets 300a, 300b, and 300c and the corresponding three image beams T1, T2, and T3 as examples, the disclosure is not limited thereto. According to further embodiments, the mirror sets 300 are arranged from left to right and from top to bottom relative to the user (e.g., the micro-reflectors 310 with different angles are arranged from left to right and from top to bottom), so that the virtual images of the image beams are arranged from left to right and from top to bottom, i.e., the virtual images of the image beams cover different field of views in the horizontal direction and the vertical direction seen by the user.

According to this embodiment, acute angles between the switching elements 220 and the original image beam LB increase sequentially along the path of the original image beam LB. Specifically, the switching elements 220c, 220b, and 220a are the first, second, and third switching element 220 on the travel path of the original image beam LB sequentially. Among the three, an angle between the switching element 220c and the original image beam LB is the smallest, and an angle of incidence and an angle of reflection of the original image beam LB on the switching element 220c are the largest. An angle between the switching element 220a and the original image beam LB is the largest, and an angle of incidence and an angle of reflection of the original image beam LB on the switching element 220a are the smallest. A size of an angle between the switching element 220b and the original image beam LB is between the switching elements 220a and 220c, and an angle of incidence and an angle of reflection of the original image beam LB on the switching element 220b are also between the switching elements 220a and 220c. However, according to other embodiments, acute angles between the switching elements 220 and the original image beam LB may also decrease sequentially along the path of the original image beam LB, or be disposed in other appropriate manners, so that the reflection paths of the original image beam LB incident on different switch elements 220 intersect at one point (i.e., the pixel 212) on the projected plate 210.

Figure 4:
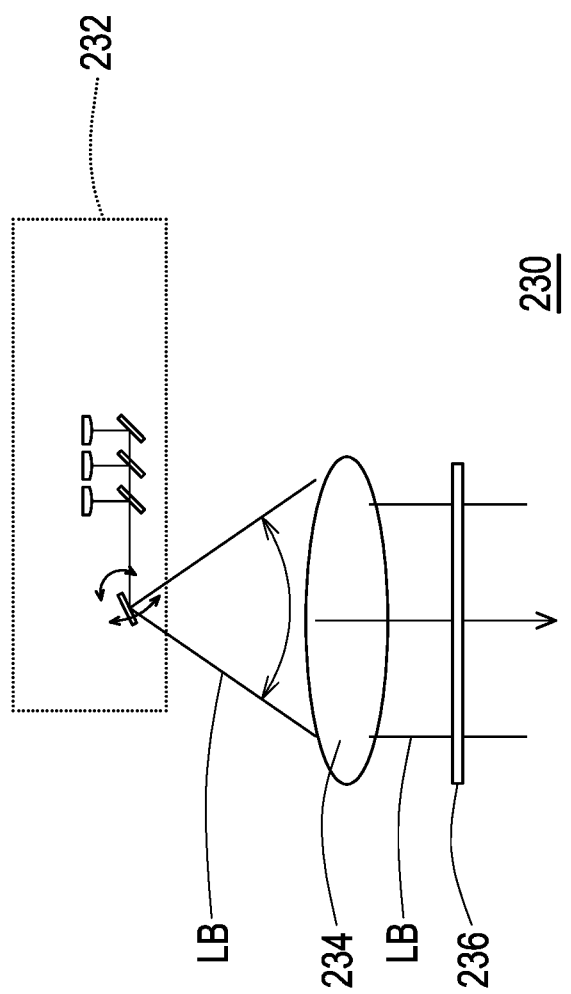
FIG. 4 is a schematic diagram of a projector of the display module of FIG. 2.

FIG. 4 is a schematic diagram of a projector of the display module of FIG. 2. Referring to FIG. 4, according to this embodiment, the projector 230 includes a laser scanning projector 232, a collimating lens 234, and a linear polarizer 236. The original image beam LB is emitted by the laser scanning projector 232, and passes through the collimating lens 234 and the linear polarizer 236 sequentially. Therefore, the original image beam LB emitted by the projector 230 is a collimated linearly polarized light.

Figure 5B:
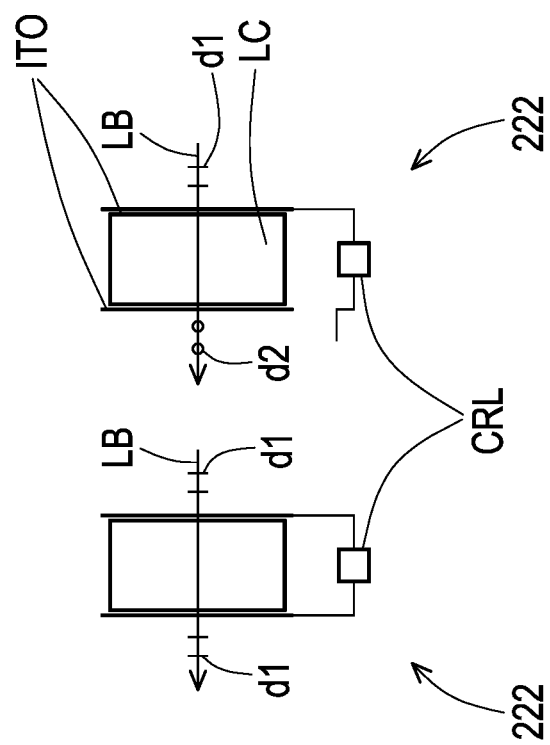
FIG. 5B is a schematic cross-sectional diagram of voltage on and off of a liquid crystal phase modulator of the switching element of FIG. 5A.
Figure 5A:
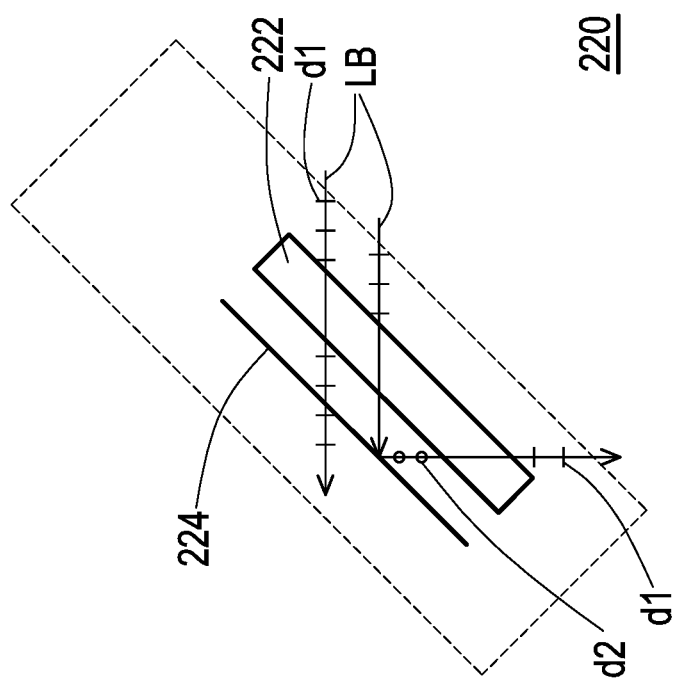
FIG. 5A is a schematic cross-sectional view of a switching element of the display module of FIG. 2.

FIG. 5A is a schematic cross-sectional view of a switching element of the display module of FIG. 2, and FIG. 5B is a schematic cross-sectional diagram of voltage on and off of a liquid crystal phase modulator of the switching element of FIG. 5A. Referring to FIG. 5A and FIG. 5B, the switching element 220 includes a liquid crystal phase modulator 222 and a polarization reflector 224. The liquid crystal phase modulator 222 and the polarization reflector 224 of the each of the switching elements 220 are arranged sequentially on an optical path of the original image beam LB. The liquid crystal phase modulator 222 includes two transparent electrodes ITO, a liquid crystal layer LC, and a controller CRL. The liquid crystal layer LC is disposed between the two transparent electrodes ITO, and the controller CRL is coupled to the two transparent electrodes ITO. The original image beam LB from the projector 230 is in a first polarization direction d1 (the first polarization direction d1 is a p-polarization direction). When the original image beam LB passes through the liquid crystal phase modulator 222, if a voltage of the controller CRL is turned on (e.g., the liquid crystal phase modulator 222 on the left side of FIG. 5B), the original image beam LB in the first polarization direction d1 (i.e., the p-polarization direction) is not changed in polarization direction after passing through the liquid crystal layer LC, and therefore subsequently transmits the polarization reflector 224 (e.g., the polarization reflector 224 near the top of FIG. 5A). If the voltage of the controller CRL is turned off (e.g., the liquid crystal phase modulator 222 on the right side of FIG. 5B), the original image beam LB in the first polarization direction d1 (i.e., the p-polarization direction) is changed to be in a second polarization direction d2 after passing through the liquid crystal layer LC (the second polarization direction d2 is a direction of entering and leaving the paper, i.e., a s-polarization direction), and is therefore reflected by the polarization reflector 224 (as shown in FIG. 5A, the light near the bottom of FIG. 5A is reflected by the polarization reflector 224). In this way, the switching elements 220 may be controlled by the controller CRL to reflect the original image beam LB or transmit the original image beam LB. According to other embodiments, depending on the liquid crystal mode, the original image beam LB in the first polarization direction d1 may be changed to be in the second polarization direction d2 after passing through the liquid crystal layer LC when the voltage of the controller CRL is turned off, and the original image beam LB is not changed in polarization after passing through the liquid crystal layer LC when the voltage of the controller CRL is turned on.

For example, according to this embodiment, if the voltages of the controllers CRL of the switching elements 220c and 220b are turned on, the original image beam LB passes through the switching elements 220c and 220b, is incident on the switching element 220a, is reflected after being incident on the switching element 220a, and generates the image beam T1 behind the projected plate 210. If the voltages of the controllers CRL of the switching elements 220c and 220b are on and off respectively, the original image beam LB passes through the switching element 220c, is reflected by the switching element 220b, and generates the image beam T2 behind the projected plate 210. If the voltage of the controller CRL of the switching element 220c is off, the original image beam LB is reflected by the switching element 220c, and generates the image beam T3 behind the projected plate 210. According to this embodiment, the switching element 220a may be replaced with a common reflector. Because one projector 230 is used to generate images of a portion of the field of views of the augmented reality image IMG, resolution of the generated images is higher than resolution of the entire augmented reality image generated by one projector, which according to this embodiment is three times the resolution.

FIG. 6 is a schematic diagram of an output state of image beams of the augmented reality display device of FIG. 1 at different times. According to this embodiment, the switching elements 220a, 220b, and 220c reflect the original image beam LB in turn, and one switching element 220 reflects the original image beam LB at each moment to generate an image beam. For example, in FIG. 6, 0 and 1 are used to indicate non-output and output. At a time Ta, the switching element 220c reflects the original image beam LB to generate the image beam T3 behind the projected plate 210. At a time Tb, the switching element 220b reflects the original image beam LB to generate the image beam T2 behind the projected plate 210. At a time Tc, the switching element 220a reflects the original image beam LB to generate the image beam T1 behind the projected plate 210. Therefore, the image light beams T1, T2, and T3 are generated behind the projected plate 210 in turn, and the image light beams T1, T2, and T3 are irradiated to the eye EY of the user in turn. If the controller CRL of the switching element 220 is switched on and off fast enough, the user has persistence of vision for the virtual images of the image beams T1, T2, and T3, and the user seems to see the complete augmented reality image IMG.

Figure 7A:
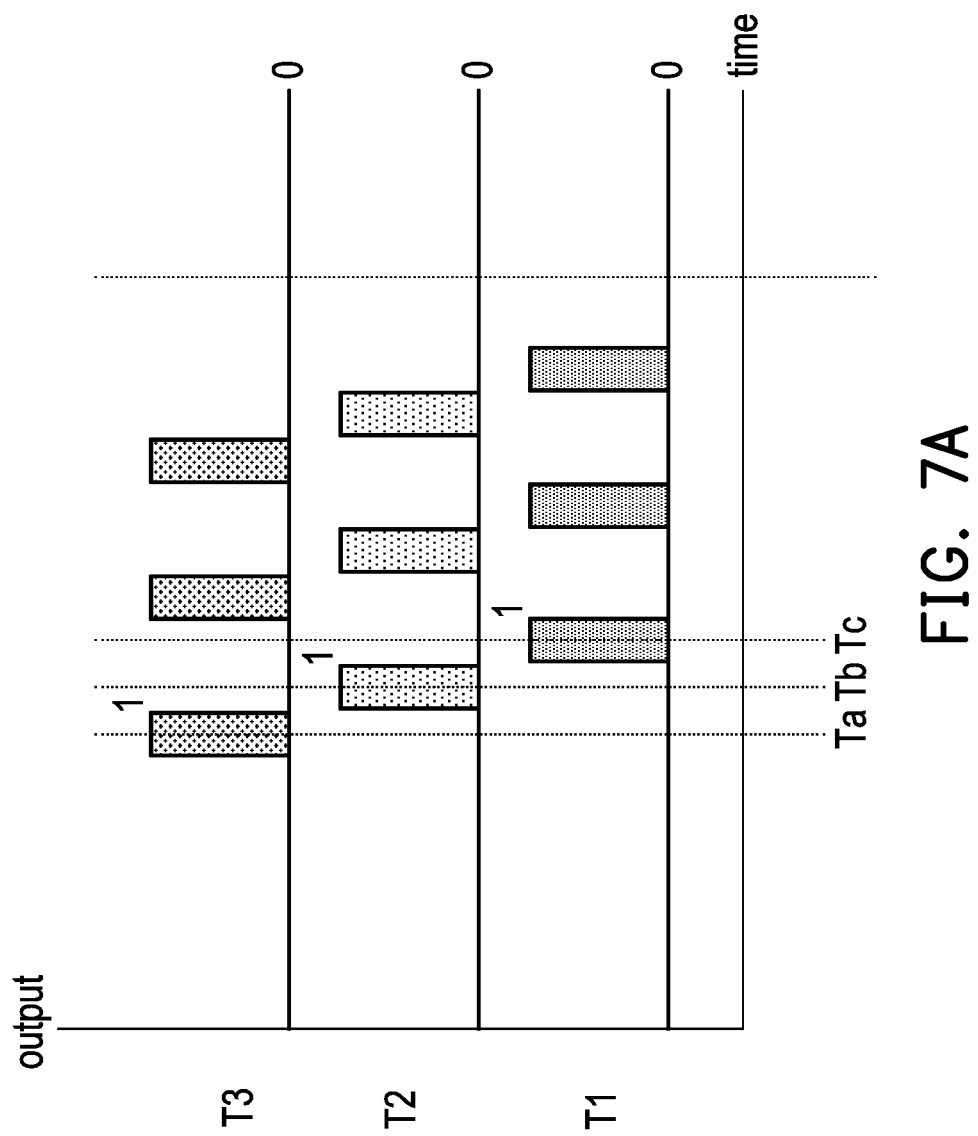
FIG. 7A is a schematic diagram of an output state of image beams of the augmented reality display device of FIG. 1 at different times according to another embodiment.
Figure 7B:
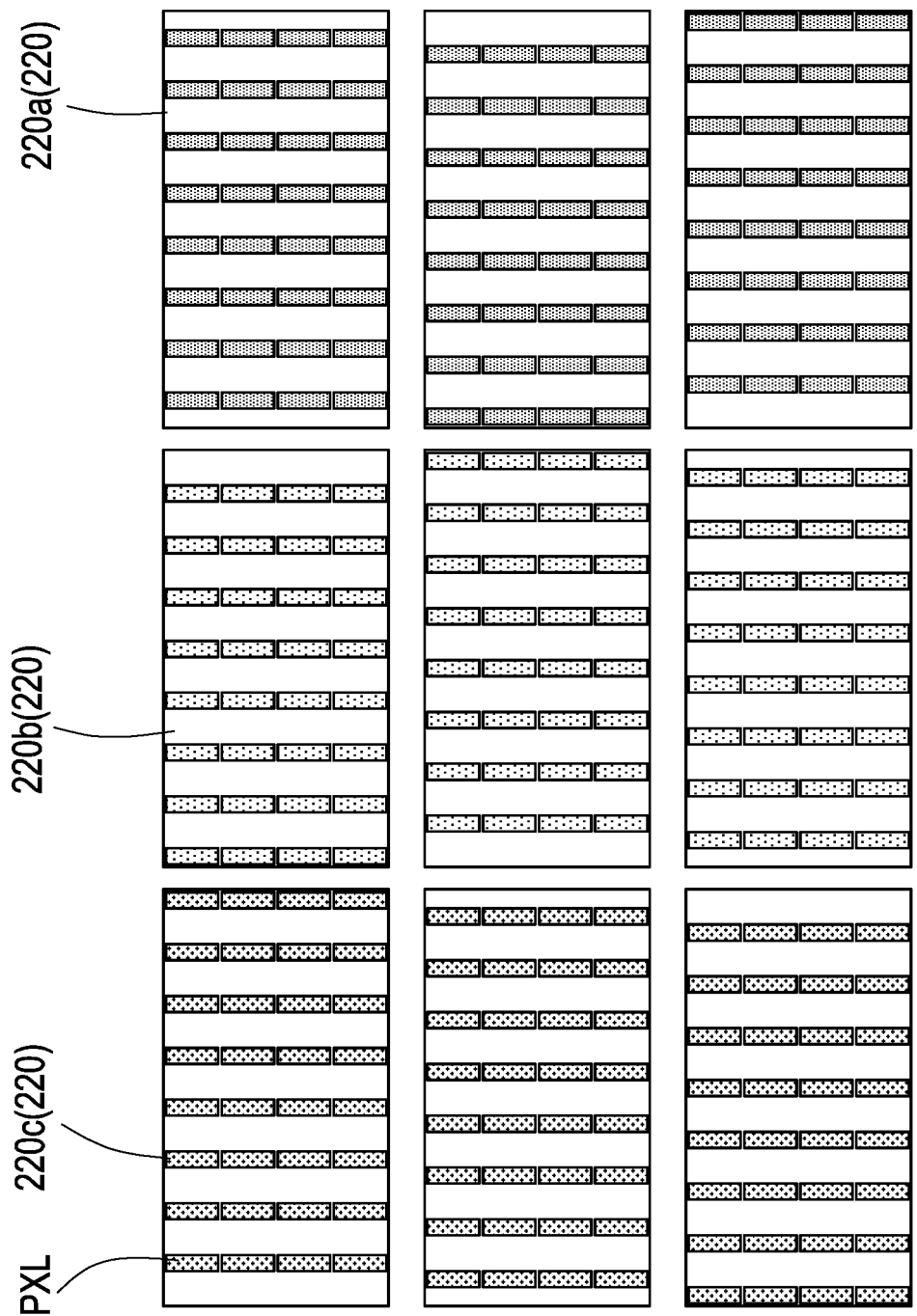
FIG. 7B is a schematic diagram of reflection positions of the image beams according to the embodiment of FIG. 7A on the switching element at different times.

FIG. 7A is a schematic diagram of an output state of image beams of the augmented reality display device of FIG. 1 at different times according to another embodiment. FIG. 7B is a schematic diagram of reflection positions of the image beams according to the embodiment of FIG. 7A on the switching element 220 at different times. According to this embodiment, the switching element 220 includes multiple pixels PXL. The pixels PXL of the each of the switching elements 220 reflect the original image beam LB in turn, and multiple switching elements 220 reflect a portion of the original image beam LB at each moment to generate a portion of the image beams. The pixel PXL includes, for example, a thin film transistor. Referring to FIG. 7A and FIG. 7B, a vertical axis of FIG. 7A is the output of the pixels PXL at corresponding positions of the each of the switching elements 220 (e.g., the output of the pixels PXL in rows 3, 6, 9 . . . ) The top row of FIG. 7B shows reflection states of the switching elements 220c, 220b, and 220a at the time Ta sequentially from left to right. The middle row of FIG. 7B shows reflection states of the switching elements 220c, 220b, and 220a at the time Tb sequentially from left to right. The bottom row of FIG. 7B shows reflection states of the switching elements 220c, 220b, and 220a at the time Tc sequentially from left to right.

For example, according to this embodiment, at the time Ta, the pixels PXL in rows 3, 6, 9 . . . of the switching element 220c reflect the original image beam LB to generate a portion of the image beam T3, and a portion of the original image beam LB not reflected by the switching element 220c passes through the remaining pixels PXL of the switching element 220c and is incident on the switching element 220b. The pixels PXL in rows 1, 4, 7 . . . of the switching element 220b reflect the original image beam LB to generate a portion of the image beam T2, and a portion of the original image beam LB not reflected by the switching element 220b passes through the remaining pixels PXL of the switching element 220b and is incident on the switching element 220a (which may also be replaced by a normal reflector), and is reflected to generate a portion of the image beam T1. At the time Tb, the pixels PXL in rows 2, 5, 8 . . . of the switching element 220c reflect the original image beam LB to generate another portion of the image beam T3, and a portion of the original image beam LB not reflected by the switching element 220c passes through the remaining pixels PXL of the switching element 220c and is incident on the switching element 220b. The pixels PXL in rows 3, 6, 9 . . . of the switching element 220b reflect the original image beam LB to generate another portion of the image beam T2, and a portion of the original image beam LB not reflected by the switching element 220b passes through the remaining pixels PXL of the switching element 220b and is incident on the switching element 220a, and is reflected to generate another portion of the image beam T1. At the time Tc, the pixels PXL in rows 1, 4, 7 . . . of the switching element 220c reflect the original image beam LB to generate yet another portion of the image beam T3, and a portion of the original image beam LB not reflected by the switching element 220c passes through the remaining pixels PXL of the switching element 220c and is incident on the switching element 220b. The pixels PXL in rows 2, 5, 8 . . . of the switching element 220b reflect the original image beam LB to generate yet another portion of the image beam T2, and a portion of the original image beam LB not reflected by the switching element 220b passes through the remaining pixels PXL of the switching element 220b and is incident on the switching element 220a, and is reflected to generate yet another portion of the image beam T1. Therefore, the image beams T1, T2, and T3 are irradiated to the eye EY of the user at the same time, and different portions of the image beams T1, T2, and T3 are irradiated to the eye EY of the user in turn. If the controller CRL of the switching element 220 is switched on and off fast enough, the user has persistence of vision for the virtual images of the different portions of the image beams T1, T2, and T3, and the user seems to see the complete augmented reality image IMG. The different portions of the image beams T1, T2, and T3 irradiated to the eye EY of the user in turn may achieve a better persistence of vision effect and reduce the flickering of the augmented reality image IMG.

Figure 8:
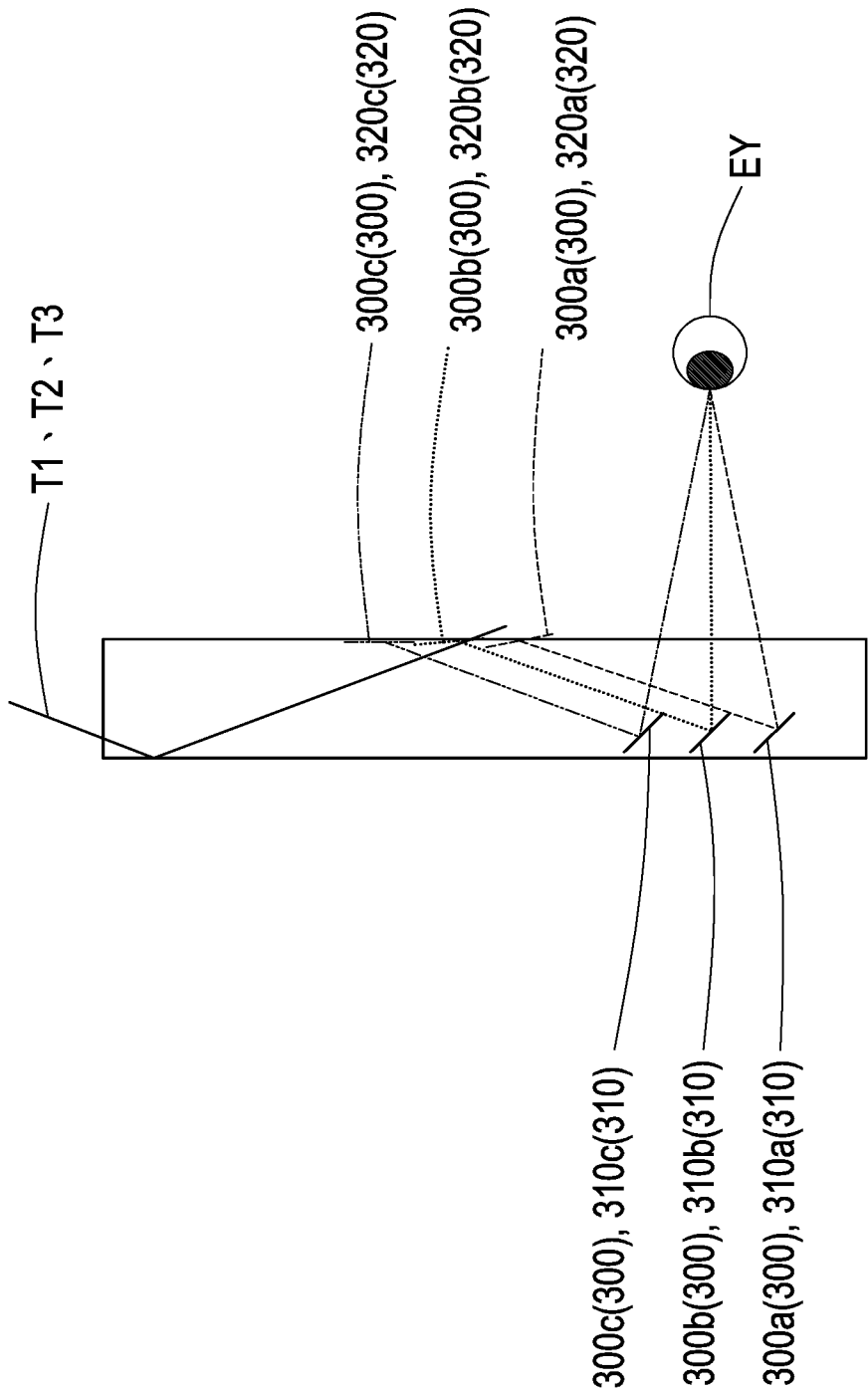
FIG. 8 is a schematic diagram of an augmented reality display device according to another embodiment of the disclosure.

FIG. 8 is a schematic diagram of an augmented reality display device according to another embodiment of the disclosure. Unlike the augmented reality display device of FIG. 1, is the each of the mirror sets 300 of the augmented reality display device 100 of FIG. 8 includes a micro-reflector 310 and a reflector 320. An image beam from the each of the switching elements 220 (e.g., one of the image beams T1, T2, and T3) is reflected sequentially by the reflector 320 (e.g., one of the reflectors 320a, 320b, and 320c) and the micro-reflector 310 (e.g., one of the micro-reflectors 310a, 310b, and 310c), and transmitted to the eye EY of the user. The reflectors 320 are disposed at different angles from each other, and the micro-reflectors 310 are disposed at the same angle from each other. According to the embodiment of FIG. 8, the mirror sets 300 are disposed inside a light guide plate. The reflector 320 may be a coating on the inner surface of the light guide plate, or the image beam may also produce total reflection directly on the inner surface of the light guide plate, so the reflector 320 may be the inner surface of the light guide plate. The advantage of using the reflector 320 is that the micro-reflector 310 may be disposed to the same angle, reducing the difficulty of manufacturing and increasing mass production.

In summary, in the augmented reality display device provided by the embodiments of the disclosure, the reflection paths of the original image beam on the switching elements intersect at one point to generate multiple image beams, and the image beams are reflected at different angles on the mirror sets, so that beams generated by the image beams may be narrowed and the lenses may be thinned. Moreover, the augmented reality display device of the disclosure projects images covering different fields of view by time division multiplexing, so it has a better resolution.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. An augmented reality display device configured to provide an augmented reality image to an eye of a user, wherein the augmented reality display device comprises:
   a display module comprising:
      a projector providing an original image beam; and
      a plurality of switching elements, wherein the switching elements are disposed sequentially on a path of the original image beam, each of the switching elements reflects or transmits the original image beam, and reflection paths of each ray of the original image beam on the switching elements intersect at one point to generate a plurality of image beams;
   a plurality of mirror sets disposed on paths of the image beams, wherein the image beams are reflected at different angles on the mirror sets, and the mirror sets reflect the image beams to the eye.

2. The augmented reality display device according to claim 1, wherein each of the mirror sets comprises a micro-reflector, and the micro-reflectors are disposed at different angles from each other.

3. The augmented reality display device according to claim 2, wherein the micro-reflector is a pinhole mirror.

4. The augmented reality display device according to claim 1, wherein each of the mirror sets comprises a micro-reflector and a reflector, an image beam from the each of the switching elements is reflected sequentially by the reflector and the micro-reflector and transmitted to the eye of the user, the reflectors are disposed at different angles from each other, and the micro-reflectors are disposed at the same angle from each other.

5. The augmented reality display device according to claim 1, further comprising an optical lens disposed on the paths of the image beams for receiving the image beams.

6. The augmented reality display device according to claim 5, wherein the mirror sets are disposed on the paths of the image beams from the optical lens.

7. The augmented reality display device according to claim 1, wherein the display module further comprises a projected plate, reflection paths of a plurality of rays of the original image beam on the switching elements intersect at a plurality of points on the projected plate to form a plurality of pixels, and each of the pixels provides the image beams with different light emitting angles.

8. The augmented reality display device according to claim 7, wherein the projected plate is a diffuser or a microlens array.

9. The augmented reality display device according to claim 7, further comprising an optical lens disposed on the paths of the image beams for receiving the image beams, wherein the image beams emitted from the pixels partially overlap on an optical path toward the optical lens.

10. The augmented reality display device according to claim 1, wherein the mirror sets are disposed inside a light guide plate.

11. The augmented reality display device according to claim 1, wherein acute angles between the switching elements and the original image beam increase sequentially along the path of the original image beam.

12. The augmented reality display device according to claim 1, wherein acute angles between the switching elements and the original image beam decrease sequentially along the path of the original image beam.

13. The augmented reality display device according to claim 1, wherein the projector comprises a laser scanning projector, a collimating lens, and a linear polarizer, the original image beam is emitted by the laser scanning projector and passes through the collimating lens and the linear polarizer sequentially.

14. The augmented reality display device according to claim 1, wherein at least some of the switching elements comprise a liquid crystal phase modulator and a polarization reflector, and the liquid crystal phase modulator and the polarization reflector of the each of the switching elements are arranged sequentially on an optical path of the original image beam.

15. The augmented reality display device according to claim 14, wherein the liquid crystal phase modulator comprises two transparent electrodes, a liquid crystal layer, and a controller, the liquid crystal layer is disposed between the two transparent electrodes, and the controller is coupled to the two transparent electrodes.

16. The augmented reality display device according to claim 1, wherein the switching elements reflect the original image beam in turn, and one switching element reflects the original image beam at each moment to generate an image beam.

17. The augmented reality display device according to claim 1, wherein the switching elements comprise a plurality of pixels, the pixels of the each of the switching elements reflect the original image beam in turn, and a plurality of the switching elements reflect a portion of the original image beam at each moment to generate a portion of the image beams.

18. The augmented reality display device according to claim 1, wherein the mirror sets are arranged from top to bottom, wherein top and bottom are relative to the user.

19. The augmented reality display device according to claim 1, wherein the mirror sets are arranged from left to right, wherein left and right are relative to the user.

20. The augmented reality display device according to claim 1, wherein the mirror sets are arranged from left to right and from top to bottom, wherein top, bottom, left, and right are relative to the user.

* * * * *